United States Patent [19]
Carroll

[11] Patent Number: 5,005,780
[45] Date of Patent: Apr. 9, 1991

[54] REEL SPRING FOR MAGNETIC TAPE CASSETTES

[75] Inventor: William M. Carroll, Milwaukee, Wis.

[73] Assignee: Koller Manufacturing Corporation, Milwaukee, Wis.

[21] Appl. No.: 460,015

[22] Filed: Jan. 2, 1990

[51] Int. Cl.⁵ .............................................. G11B 15/32
[52] U.S. Cl. ...................... 242/199; 360/132
[58] Field of Search ............... 242/197, 198, 199, 200; 360/132

[56] References Cited

U.S. PATENT DOCUMENTS

| | | | |
|---|---|---|---|
| 4,613,095 | 9/1986 | Shoettle et al. | 242/198 |
| 4,662,579 | 5/1987 | Gelardi et al. | 242/199 |
| 4,770,367 | 9/1988 | Carroll | 242/199 |
| 4,781,340 | 11/1988 | Shiba et al. | 242/199 |

Primary Examiner—Daniel P. Stodola
Assistant Examiner—William G. Battista
Attorney, Agent, or Firm—Kinzer, Plyer, Dorn, McEachran & Jambor

[57] ABSTRACT

A reel spring for a magnetic tape cassette is formed from an elongated strip of stainless steel. The strip defines first and second edges extending throughout its length parallel to a longitudinal centerline. The strip has a flat, central base portion terminating at a first pair of transverse crimp lines. The crimp lines define transition sections which extend out of the plane of the base portion at a first angle. A second pair of transverse crimp lines at the ends of the transition sections define end portions of the strip. The end portions extend at a second angle to the plane of the base portion. The width of the strip between the first and second edges is about 0.315 inches.

1 Claim, 1 Drawing Sheet

REEL SPRING FOR MAGNETIC TAPE CASSETTES

SUMMARY OF THE INVENTION

This invention relates to magnetic tape cassettes and is particularly concerned with an improved reel spring therefor. A reel spring is mounted in the tape cassette housing. The spring typically has a somewhat elongated configuration and is attached to the housing intermediate its ends. The free ends of the spring are curved or bent away from the housing and extend toward the tape reels. The free ends contact the hubs of the tape reels, biasing the reels toward one side of the housing. The spring also provides bearings on which the reels turn. The application of a reel spring in a housing is shown in U.S. Pat. No. 4,770,367.

The task to be performed by a reel spring requires certain physical characteristics, such as a spring rate within a given range and good wear resistance. A spring rate of about 900 to 1220 grams per inch is preferred. One of the problems facing spring designers is to provide the required performance at the least possible cost per part. For example, while stainless steel has been found to be a suitable material for use in reel springs, its cost is such that minimizing the amount used to make a spring is of paramount concern. This invention is directed to a spring that reduces the amount of material used to make a functional spring below the amount heretofore thought possible. Specifically, the stainless steel reel spring of the present invention has a generally elongated rectangular configuration with a width of about 0.315 inches. This is about 10% narrower than previously thought possible for a given spring rate. The resulting material savings of about 10% results in comparatively less expensive parts.

DETAILED DESCRIPTION OF THE INVENTION

Figure 1:
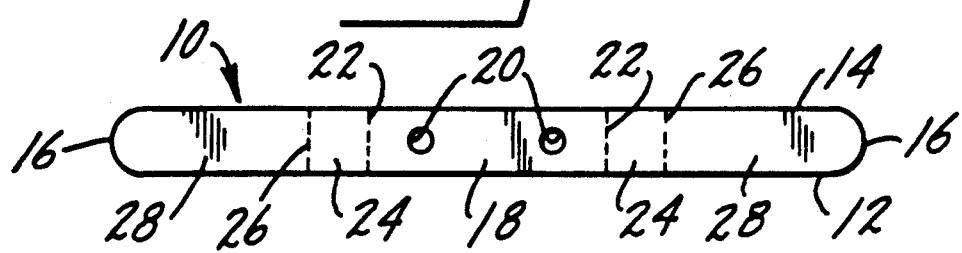
FIG. 1 is a plan view of the reel spring of the present invention.
Figure 2:
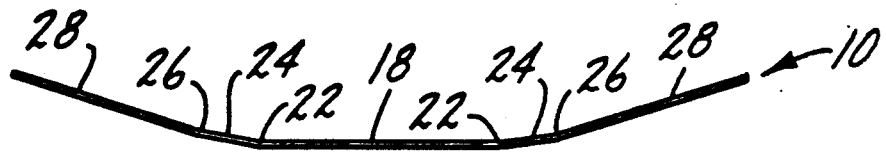
FIG. 2 is a side elevation view of the spring.

FIGS. 1 and 2 illustrate a reel spring 10 for a magnetic tape cassette, according to the present invention. The spring is a strip of stainless steel. The strip has a generally rectangular configuration defined by first and second longitudinal edges 12 and 14. These edges extend virtually the entire length of the spring, parallel to a longitudinal centerline. The edges are joined by rounded tips 16.

The spring has a flat, central base portion 18 which is adapted to adjoin the cassette housing. A pair of holes 20 are cut in the base to facilitate attachment of the spring to the housing. A pair of transverse crimps or fold lines 22 determine the extent of the base portion. The crimps define transition sections 24 of the spring. The transition sections 24 are bent out of the plane of the base, preferably at an angle of about 10 degrees to the base. The transition sections 24 terminate at a second set of crimps 26. These crimps define end portions 28. The end portions are bent out of the plane of the base at a second, greater angle to the plane of the base. Preferably, this angle is about 17 degrees.

The dimensions of a spring known to operate effectively are as follows. The length in the flat condition is 3.937 inches. The first crimps 22 are about 1.25 inches apart and the second crimps 26 are about 1.87 inches apart. Both sets of crimps are symmetric about the center of the spring. The thickness of the strip is about 0.012 inches. When the spring is at rest the tips are located 0.390 inches above the base portion. When the tips are deflected to a distance of 0.079 inches from the base, the spring exerts a force of about 280–380 grams.

The width between the longitudinal edges 12 and 14 in the present invention is 0.315 inches. This constitutes a departure from prior practice. Previously it was thought that a width about 10% greater than 0.315 was necessary to make a functional spring. The significant reduction in spring width of the present invention results in a corresponding reduction in the volume of material used to make the spring. This in turn allows for material cost savings for each spring made.

Whereas a preferred form of the invention has been shown and described, it will be realized that modifications could be made thereto without departing from the scope of the following claims.

I claim:

1. In a magnetic tape cassette, a reel spring comprising an elongated strip of stainless steel having first and second edges extending substantially throughout its length parallel to a longitudinal centerline, the width between the first and second edges being about 0.315 inches, the strip including:

a flat, central base portion;

a first pair of transverse crimps at the ends of the base portion defining transition sections of the strip extending at a first angle to the plane of the base portion;

a second pair of transverse crimps at the outer ends of the transition sections defining end portions of the strip extending at a second angle to the plane of the base portion and terminating at tips;

the first and second angles and the lengths of the transition sections and end portions being chosen such that when the spring is at rest the tips are located about 0.390 inches above the base portion and when the tips are deflected to a distance of about 0.079 inches from the base, the spring exerts a force of about 280–380 grams; and means for mounting said reel spring to the cassette, said means being formed in said base portion.

* * * * *